United States Patent Office 3,354,080
Patented Nov. 21, 1967

3,354,080
PROCESS FOR THE REMOVAL OF MERCAPTANS FROM HYDROCARBONS
John H. Haslam, Landenberg, Pa., assignor to E. I. du Pont de Nemours and Company, Wilmington, Del., a corporation of Delaware
No Drawing. Filed Feb. 4, 1965, Ser. No. 430,448
8 Claims. (Cl. 208—231)

ABSTRACT OF THE DISCLOSURE

The effectiveness of an aqueous alkaline solution in the removal of simple mercaptans from hydrocarbons such as gasoline and other petroleum distillates can be improved by adding to the solution a mercapto-alcohol, mercapto-amine or dithio compound having the general formula:

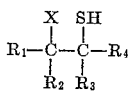

where X is —SH, —OH or —NH$_2$ and R$_1$, R$_2$, R$_3$ and R$_4$ are hydrogen, alkyl of 1 to 10 carbons, alkoxyalkyl of 2 to 7 carbons, hydroxylalkyl of 1 to 4 carbons, cycloalkyl of 4 to 8 carbons, hydroxycycloalkyl of 4 to 8 carbons, mercaptohydroxycycloalkyl of 4 to 8 carbons and phenyl, with the proviso that when R$_1$ and R$_4$ are both hydrogen, R$_2$ and R$_3$ taken together can be alkylene of 3 to 5 carbons, and with the further proviso that R$_1$, R$_2$, R$_3$ and R$_4$ taken together total less than 11 carbons.

---

This invention relates to the removal of mercaptans from hydrocarbons. It is more particularly concerned with an improvement in the process of extracting mercaptans from hydrocarbons such as gasoline and other petroleum distillates with aqueous alkali solutions.

Mercaptans are commonly removed from hydrocarbons by extraction with aqueous alkali. This is done in order to improve odor and, in gasolines, to improve lead susceptibility. The alkali solutions are effective to remove substantially all of the lower molecular weight mercaptans, such as ethyl mercaptan. In order to effectively remove the higher molecular weight mercaptans, however, it has been found necessary to add to the alkali solution used in the extraction a small amount of a substance which increases the solubility of these mercaptans in the aqueous alkali. Such substances are known as solutizers. Examples of solutizers heretofore used in the art for removing mercaptans from hydrocarbons are lower alkanoic acids and cresols.

An alternative method of removing mercaptans is to oxidize them to the corresponding disulfides. In this process the disulfides are left in the hydrocarbon and while the objectionable mercaptan odor is eliminated, the lead susceptibility, in the case of gasoline, is not improved. An extraction process in which the sulfur compounds are removed is preferable.

According to this invention it has been found that addition of a mercapto-alcohol, mercapto-amine or dithiol compound to aqueous solutions of alkali will greatly increase the effectiveness of such solutions for extracting mercaptans from hydrocarbons, including petroleum distillates. Ordinarily, as an alkali solution increases in content of simple mercaptans, such as those being extracted from petroleum distillates, it becomes decreasingly efficient for removing additional quantities of these mercaptans. It is therefore surprising to find that the addition of certain mercapto compounds, i.e., mercapto-alcohols, mercapto-amines or dithiol compounds increases the efficiency of an alkali solution to extract simple mercaptans from hydrocarbons.

It has also surprisingly been found that the aqueous alkali solutions containing a mercapto-alcohol, mercapto-amine or dithiol compound which have been used in accordance with this invention to extract simple mercaptans from hydrocarbons until they have become substantially saturated with such mercaptans can be regenerated by steam distillation. The steaming process, which is commonly used in the art to regenerate alkali solutions saturated with mercaptans, removes the mercaptans overhead, and leaves behind substantially all of the mercapto-alcohol, mercapto-amine or dithiol compound in the aqueous alkali. The alkali solution can then be recycled to extract further quantities of mercaptans.

The compounds used according to this invention for addition to alkali solutions are in general mercapto-alcohols, mercapto-amines, and dithiol compounds containing between 2 and about 12 carbon atoms. The preferred compounds are those wherein the —OH, —SH, or —NH$_2$ group is attached to a carbon atom which is adjacent to the carbon atom carrying the thiol group. These compounds can be represented by the general formula:

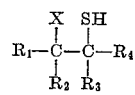

where X=—SH, —OH, —NH$_2$.

R$_1$, R$_2$, R$_3$, and R$_4$=H, alkyl of 1–10 carbons, alkoxyalkyl of 2–7 carbons, hydroxyalkyl of 1–4 carbons, cycloalkyl of 4–8 carbons, hydroxycycloalkyl of 4–8 carbons, mercaptohydroxycycloalkyl of 4–8 carbons and phenyl, with the proviso that when R$_1$ and R$_4$ are both hydrogen, R$_2$ and R$_3$ taken together can be alkylene of 3–5 carbons, and with the further proviso that R$_1$, R$_2$, R$_3$, and R$_4$ taken together total less than 11 carbons.

In order to simplify the discussion the term "mercapto compounds" will be used throughout the remainder of the specification to refer to the mercapto-alcohols, mercapto-amines, and dithiol compounds, and to distinguish them from the mercaptans in the hydrocarbon fraction which will be referred to as "mercaptans" or "simple mercaptans." The term "simple mercaptans" will also be used in the claims to identify the mercaptans in the hydrocarbon fraction.

Illustrative of the mercapto compounds used in the invention are:

2-mercaptoethanol
2-mercaptopropanol-1
1-mercaptopropanol-2
1-phenyl-2-mercaptoethanol
1-mercaptododecanol-2
3-ethoxy-1-mercaptopropanol-2
α-thiosorbitol
2-mercaptoethylamine
1,2-ethanedithiol
1,2-dithioglycerol The preferred compounds for use in this invention, because of their effectiveness, cost, and availability, are 2-mercaptoethanol, α-thiosorbitol, 1,2-dithioglycerol, and ethanedithiol.

The alkali solutions contemplated for use in the process of this invention are those commonly used in the art for extracting mercaptans from hydrocarbons. Thus, there can be used for example solutions of alkali or alkaline earth metal hydroxides, ammonium hydroxide, quaternary ammonium bases, and alkaline reacting carbonates and bicarbonates. The alkali metal hydroxides are most commonly used, and sodium hydroxide is of course preferred because of its cost and availability.

The concentration of the alkali solution used in the process is not critical. Use of extremely dilute solutions is avoided because of the necessity of handling large volumes of liquids. Too concentrated solutions are likewise preferably avoided, so the concentration will ordinarily range from about 1% to about 25% by weight of alkali based on the total weight of solution. Normally it will be preferred to operate with an alkali solution having a concentration in the range of about 10% to about 15%.

The concentration of mercapto compound in the alkali solution can also vary considerably and will depend upon the particular compound used. Normally the concentration of the mercapto compound will range from about 0.01% up to about 10% by weight based on the total weight of the solution. Larger amounts can be used but any advantage gained thereby is usually insufficient to justify the increased cost of the reagent. Ordinarily it will be preferred to operate with a solution having a mercapto compound concentration in the range of about 0.1% to about 5% by weight.

Other additives may be included in the alkali solutions for specific purposes according to conventional practice in the art without detracting from the beneficial effects obtained by the inclusion of the mercapto compound. Thus, for example, if the process is operated in such a fashion that the alkali solution comes into contact with air, it may be advantageous to include in the alkali solution substances which will retard the oxidation of the mercapto compounds. Suitable materials for this purpose include the sulfites, bisulfites, metabisulfites, and hydrosulfites of sodium, potassium and lithium. It may also be desirable to include anti-oxidants for the hydrocarbon such as phenylenediamine. Foam depressants, anti-corrosion agents, and other additives for specific purposes can also be included without interfering with the operation of the process.

The extraction process of this invention can be carried out according to conventional procedures by merely mixing the hydrocarbon containing mercaptans to be extracted with the aqueous alkali solution containing the mercapto compound under conditions which will provide intimate contacting of hte phases. This is done of course on the laboratory scale by merely adding the hydrocarbon and alkali solution to a separatory funnel or other container and shaking or stirring vigorously. In larger operations, the phases can be added ot a mixing vessel of appropriate size and agitated with a propeller-type mixer. In either case, after mixing, the phases are allowed to separate and the hydrocarbon phase is drawn off the top and the aqueous alkali containing substantially all of the mercaptans alkali containing substantially all of the mercaptans originally in the hydrocarbon is drawn off the bottom.

Alternatively, the process can be carried out continuously by contacting the phases in an extraction column, preferably with countercurrent flow. Thus, the hydrocarbon containing mercaptans to be extracted can be introduced into the bottom of a column and the aqueous alkali solution can be introduced at the top. The hydrocarbon phase substantially free of mercaptans is thus drawn off the top of the column and the alkali solution containing the extract mercaptans and the mercapto compound exits from the bottom.

All of these methods are so conventional as to require no extended discussion. The countercurrent flow method is of course preferred for commercial operation, not only because it permits continuous operation, but also because it is very efficient. Thus, the hydrocarbon, as it rises in the extraction column is continuously met by alkali solution which is progressively lower in mercaptans concentration with the result that the process is equivalent to a number of single extractions. However, it is to be noted that when using alkali solutions containing a mercapto compound in accordance with this invention, the efficiency of the alkali solution is increased to such an extent that it is possible to obtain with a single extraction hydrocarbons having a sufficiently small concentration of mercaptans to be suitable for most applications. Thus, for example, ordinary sour gasoline which contains about 0.01% by weight of mercaptan sulfur can be treated with an equal volume of 15% caustic alkali solution containing, say 1% 2-mercaptoethanol to provide a gasoline having a mercaptan sulfur concentration well below the range of 0.001% to 0.003% considered acceptable. When using caustic solutions containing the solutizers heretofore used in the art (cresols and lower alkanoic acids) it has been possible to attain these low mercaptan concentrations in gasolines only with repeated extractions or in an extraction column with countercurrent flow.

A typical commercial operation for extraction of mercaptans from petroleum distillates will include three basic steps: (1) caustic pre-treatment for the removal of hydrogen sulfide; (2) treatment with a caustic solution containing a mercapto compound as herein defined; and (3) regeneration of the caustic solution by removal of mercaptans.

The caustic pretreatment is carried out according to conventional procedures. A single mixer-settler arrangement is satisfactory for this purpose. This step is often necessary to remove acid components such as hydrogen sulfide.

After the caustic pretreatment, the petroleum distillate is contacted with a caustic solution containing a mercapto compound in a countercurrent extraction column as described above. The treated hydrocarbon flows from the extraction unit to storage or subsequent operations. The spent treating solution enters the regenerator which is essentially a batch still with direct steam heat. The solution is steamed for one-half to one hour and the extracted mercaptans are vaporized and removed overhead leaving substantially all of the mercapto compound in the caustic solution. The caustic solution is then recycled to the process, together with make-up caustic solution and mercapto compound as required.

The temperature of the extraction is not critical and can range anywhere from as low as the freezing point of the solution up to the boiling point of the solution and even higher if pressure equipment is used. As a practical matter it is normally preferred to operate at a temperature in the range of about 25° C. to about 90° C. The rate of extraction is faster at higher temperatures.

The ratio of alkali solution to hydrocarbon can also vary widely. Normally a ratio in the range of 10 to 100 parts by weight of alkali solution to 100 parts by weight of hydrocarbon will be used. A preferred range is about 20 to 40 parts of alkali solution per part of hydrocarbon.

Contact time in the extraction unit will of course depend upon a number of factors, including the temperature of the operation, the mercaptan content of the hydrocarbon, the ratio of alkali solution to hydrocarbon, the degree of mixing of the hydrocarbon and aqueous phases, and of course upon the particular alkali and mercapto compound used and their concentrations in the solution. Residence time in the unit for the hydrocarbon phase will normally range from about one-half hour to about one and one-half hours, although hydrocarbons which are extremely low in mercaptan content will require an even lower residence time, occasionally as low as 15 or even 5 minutes.

In order to further describe the invention, the following illustrative examples are given. All percentages listed in the examples are by weight unless otherwise specified. In these examples, distribution coefficients (K) for mercaptans in hydrocarbons versus aqueous caustic alkali solutions were determined as follows: 100 ml. of hydrocarbon containing approximately 0.01% mercaptan sulfur was shaken for one hour on a mechanical shaker with various alkaline solutions and under a nitrogen atmosphere to avoid oxidation and to obtain a true equilibrium distribution between the two. The hydrocarbon layer was separated and washed twice with water and then filtered to remove any water haze which remained. A 25 ml. aliquot was then pipetted into 25 ml. of 0.005 M silver nitrate and back titrated with 0.005 M ammonium thiocyanate. This method for mercaptan analysis is described in Organic Analysis, vol. 1, p. 332, Interscience Publ. Inc,. New York, 1953. The amount of mercaptan sulfur originally in the hydrocarbon layer was determined by the same procedure and from the analysis after the treatment, the difference was assumed to have gone into the aqueous layer. The distribution coefficient was then calculated as $$K = \frac{S_0 - S_F}{S_F}$$

$S_0$ = percent mercaptan sulfur originally in sample
$S_F$ = percent mercaptan sulfur in sample after treatment In a few cases the total sulfur content of the hydrocarbon phase was determined in order to prove that the sulfur was being extracted rather than being oxidized to non-mercaptan sulfur. In each case the total sulfur content corresponded to the mercaptan sulfur analysis proving that the mercaptans were being extracted and not just oxidized.

Example 1

The effectiveness of various concentrations of 2-mercaptoethanol (2-ME) in 14% sodium hydroxide in extracting various mercaptans from cyclohexane was determined according to the method described with the results reported in the following table:

TABLE I

| Aqueous Layer | Mercaptan | $S_0$ | $S_F$ | K |
|---|---|---|---|---|
| No additive | n-Hexyl | 0.0110 | 0.0090 | 0.23 |
| 2% 2-ME | do | 0.0110 | 0.0000 | ∞ |
| 1% 2-ME | do | 0.0110 | 0.0003 | 36 |
| 0.5% 2-ME | do | 0.0110 | 0.0000 | ∞ |
| 0.1% 2-ME | do | 0.0110 | 0.0063 | 0.76 |
| No additives | n-Decyl | 0.0103 | 0.0095 | 0.08 |
| 2% 2-ME | do | 0.0103 | 0.0000 | ∞ |
| 1% 2-ME | do | 0.0103 | 0.0000 | ∞ |
| 0.5% 2-ME | do | 0.0103 | 0.0034 | 2.0 |
| 0.1% 2-ME | do | 0.0103 | 0.0058 | 0.78 |
| No additive | n-Dodecyl | 0.0088 | 0.0080 | 0.10 |
| 1% 2-ME | do | 0.0088 | 0.0000 | ∞ |
| 0.5% 2-ME | do | 0.0088 | 0.0000 | ∞ |

It should be pointed out that the accuracy of the analyses in these low percentages of sulphur is not too great and that a K reported as infinity may actually be something like 25. This is, nevertheless, a very high K since K values as low as 0.5 may be quite practical in a continuously operating column.

The K values reported are significantly greater than those which can be obtained by the same method using caustic solutions containing currently used solutizers such as o-cresol and isobutyric acid.

Example 2

Using the method described to determine distribution coefficients the effect on mercaptan extraction efficiency of varying the concentration of NaOH in 1% solutions of 2-mercaptoethanol was determined. The hydrocarbon treated was cyclohexane containing approximately 0.01% of added mercaptan sulfur. The results were as follows:

TABLE II

| Percent NaOH | Mercaptan | $S_0$ | $S_F$ | K |
|---|---|---|---|---|
| 10 | n-Hexyl | 0.0105 | 0.0003 | 35 |
| 5 | do | 0.0105 | 0.0000 | ∞ |
| 2 | do | 0.0105 | 0.0002 | 54 |
| 1 | do | 0.0105 | 0.0005 | 21 |
| ½ | do | 0.0108 | 0.0049 | 1.2 |
| 5 | n-Decyl | 0.0061 | 0.0001 | 60 |
| 1 | do | 0.0084 | 0.0004 | 20 |
| 5 | n-Dodecyl | 0.0081 | 0.0001 | 80 |
| 1 | do | 0.0081 | 0.0006 | 12.5 |

Example 3

Sulfur compounds other than mercaptans may be present in petroleum distillates. To illustrate the effect such compounds have on the effectiveness of 2-mercaptoethanol two runs were made to determine distribution coefficients according to the method which has been described. In each case the aqueous layer was 2% NaOH+1% 2-mercaptoethanol and the hydrocarbon phase was cyclohexane containing approximately 0.01% mercaptan sulfur as n-hexyl mercaptan. In the first run 0.5% thiophene was added to the caustic solution and the hydrocarbon phase after extraction was found to contain 0.0001% mercaptan sulfur, which gave a K value of 108. In the second run 0.5% ethyl sulfide was added and all of the mercaptan insofar as could be determined analytically was extracted from the hydrocarbon phase, giving a theoretical K value of infinity. Thus these other sulfur-containing compounds do not interfere with the effect of 2-mercapto-ethanol in increasing the effectiveness of caustic solutions to extract mercaptans from hydrocarbons.

Example 4

Phenolic compounds such as cresols are also normally present in gasoline. To illustrate the effect of such compounds on the action of 2-mercaptoethanol two runs were made, using the method which has been described to determine distribution coefficients, with o-cresol present. In both runs the hydrocarbon used was cyclohexane to which had been added approximately 0.01% mercaptan sulfur as n-hexyl mercaptan. In the first run a caustic solution containing 14% sodium hydroxide, 0.5% 2-mercapto-ethanol and 5% o-cresol was used. After extraction with this solution the percent mercaptan sulfur in the hydrocarbon phase was 0.0013 giving a K value of 7.4. In the second run a caustic solution containing 14% sodium hydroxide, 0.1% 2-mercaptoethanol, and 5% o-cresol was used. After extraction with this solution the percent mercaptan sulfur in the hydrocarbon phase was 0.0094 giving a K value of 0.15.

Example 5

The capacity of 2-mercaptoethanol-caustic alkali solutions containing ethyl mercaptan to absorb additional mercaptan was illustrated using a series 14% NaOH solutions containing various concentrations of 2-mercaptoethanol and added ethylmercaptan, to extract a mercaptan from a simulated sour gasoline. The hydrocarbon used in each run of this series was cyclohexane containing approximately 0.01% added n-hexyl mercaptan. Distribution coefficients were obtained using the method which has been described and used in the above examples. The results are given in Table III.

TABLE III

| Percent 2-ME | Percent Ethylmercaptan | $S_0$ | $S_F$ | K |
|---|---|---|---|---|
| 2 | 0.5 | 0.0109 | 0.0097 | 0.12 |
| 3 | 0.5 | 0.0109 | 0.0084 | 0.30 |
| 4 | 0.5 | 0.0109 | 0.0081 | 0.35 |
| 5 | 0.5 | 0.0109 | 0.0042 | 1.6 |
| 5 | 1 | 0.0109 | 0.0087 | 0.25 |
| 1 | 0.4 | 0.0109 | 0.0093 | 0.17 |
| 1 | 0.3 | 0.0109 | 0.0079 | 0.38 |
| 1 | 0.2 | 0.0109 | 0.0068 | 0.60 |
| 1 | 0.1 | 0.0109 | 0.0040 | 1.7 |
| 2 | 0.2 | 0.0109 | 0.0035 | 2.1 |
| 2 | 0.1 | 0.0109 | 0.0006 | 17 |
| 5 | 0.1 | 0.0109 | 0.0004 | 26 |
| 5 | 0.2 | 0.0109 | 0.0015 | 6.2 |

It should be noted that the K values given in Table III were calculated only on the hexylmercaptan in the organic layer before and after extraction. They are therefore not true K's since the ethylmercaptan in the aqueous layer was ignored. However, the results do illustrate the ability of the various caustic solutions already containing mercaptans to extract additional mercaptans.

*Example 6*

Distribution coefficients were obtained according to the method which has been described using caustic solutions containing various mercapto-alcohols, mercapto-amines, and dithiol compounds. In this series the hydrocarbon used was cyclohexane to which had been added approximately 0.01% mercaptan sulfur as n-hexyl mercaptan and the aqueous phase was 14% sodium hydroxide. The compounds used and results obtained are given in Table IV.

TABLE IV

| Aqueous Layer | Concentration | $S_0$ | $S_F$ | K |
|---|---|---|---|---|
| 1-mercaptopropanol-2 | 0.5 | 0.0122 | 0.0053 | 1.3 |
| 2-mercaptopropanol-1 | 0.5 | 0.0122 | 0.0028 | 3.4 |
| Phenyl mercaptoethanol | 0.5 | 0.0122 | 0.0044 | 0.56 |
| Trans-1-mercaptocyclohexanol-2 | 0.5 | 0.0122 | 0.0073 | 0.6 |
| 1-mercaptododecanol-2 | 0.5 | 0.0124 | 0.0083 | 0.5 |
| 3-ethoxy-1-mercaptopropanol-2 | 0.5 | 0.0121 | 0.0022 | 8.4 |
| 3-butoxy-1-mercaptopropanol-2 | 0.5 | 0.0122 | 0.0007 | 16.5 |
| 3-hexoxy-1-mercaptopropanol-2 | 0.5 | 0.0122 | 0.0018 | 5.8 |
| 4(2'-mercapto-1'-hydroxy-ethyl)-2-mercaptocyclohexanol | 0.5 | 0.0122 | 0.0017 | 6.2 |
| α-Thiosorbitol | 2 | 0.0122 | 0.0000 | ∞ |
| Mercapto-ethylamine | 2 | 0.0111 | 0 0003 | 26 |
| Do | 0.5 | 0.0112 | 0.0004 | 27 |
| Ethanedithiol | 0.5 | 0.0112 | 0.0000 | ∞ |
| 1,2-dithioglycerol | 0.5 | 0.0112 | 0.0000 | ∞ |

*Example 7*

A series of 14% caustic solutions containing 2-mercaptoethanol were prepared, placed in a flask, and subjected to steaming for various periods of time ranging from 10 to 30 minutes. In each run the caustic 2-mercaptoethanol solution was heated to boiling before introduction of steam. The flask was weighed at the start and steam was run in for the allotted time. Heat was maintained on the flask so that it lost weight rather than being diluted by condensed steam. At the end of the run, water was added to bring the weight back to its original value. Analysis of the solutions showed that there was substantially no loss of 2-mercaptoethanol during the steaming process.

In another run a 10% sodium hydroxide, 2% 2-mercaptoethanol, 0.5% ethyl mercaptan solution was steamed for 30 minutes. The analysis showed 2.49% mercaptan before steaming and 2.13% after steaming. The equilibrium distribution coefficient using simulated sour gasoline containing hexyl mercaptan was essentially zero before steaming and infinity after steaming showing that the solution was effectively regenerated and that a substantial portion of the ethyl mercaptan was removed.

In a similar run using a 10% sodium hydroxide, 2% 2-mercaptoethanol, 0.2% hexyl mercaptan solution the K with hexyl mercaptan sour gas was negative before steaming and infinity after steaming. This was a rather surprising although happy result since the boiling point of hexyl mercaptan is approximately the same as that of 2-mercaptoethanol. These results show that 2-mercaptoethanol caustic solutions can be steamed without substantial loss of 2-mercaptoethanol and can be effectively regenerated for reuse.

The invention claimed is:

1. A process for extracting simple mercaptans from hydrocarbons which comprises contacting the hydrocarbon with an aqueous alkali solution containing at least 0.01% by weight, based on the total weight of the solution, of a mercapto compound of the formula

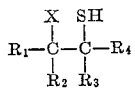

where —X is —SH, —OH or —NH$_2$ and R$_1$, R$_2$, R$_3$ and R$_4$ are hydrogen, alkyl of 1 to 10 carbons, alkoxyalkyl of 2 to 7 carbons, hydroxyalkyl of 1 to 4 carbons, cycloalkyl of 4 to 8 carbons, hydroxycycloalkyl of 4 to 8 carbons or mercaptohydroxycycloalkyl of 4 to 8 carbons, with the proviso that R$_1$, R$_2$, R$_3$ and R$_4$ taken together contain a total of less than 11 carbon atoms.

2. The process of claim 1 wherein the concentration of the mercapto compound in said solution is from 0.01% to 10% by weight based on the total weight of the solution.

3. The process of claim 1 wherein the concentration of the mercapto compound in said solution is from 0.1% to 5% by weight based on the total weight of the solution.

4. The process of claim 1 wherein said alkali is sodium hydroxide.

5. The process of claim 4 wherein the concentration of the mercapto compound in said solution is from 0.1% to 5% by weight based on the total weight of the solution.

6. A process for extracting simple mercaptans from petroleum distillates which comprises contacting the petroleum distillate with an aqueous solution of sodium hydroxide containing from 0.1% to 5% by weight based on the total weight of the solution of 2-mercaptoethanol.

7. The process of claim 6 which comprises the additional step of subjecting the aqueous solution of sodium hydroxide, after it has been used to extract the mercaptans from the petroleum distillate to steam distillation to remove the mercaptans.

8. The process of claim 6 wherein the petroleum distillate is contacted with the aqueous phase in an extraction column with countercurrent flow.

References Cited

UNITED STATES PATENTS 2,292,636   8/1942   Henderson et al. ____ 208—231

DELBERT E. GANTZ, *Primary Examiner.*

S. P. JONES, *Assistant Examiner.*